Figure 7:
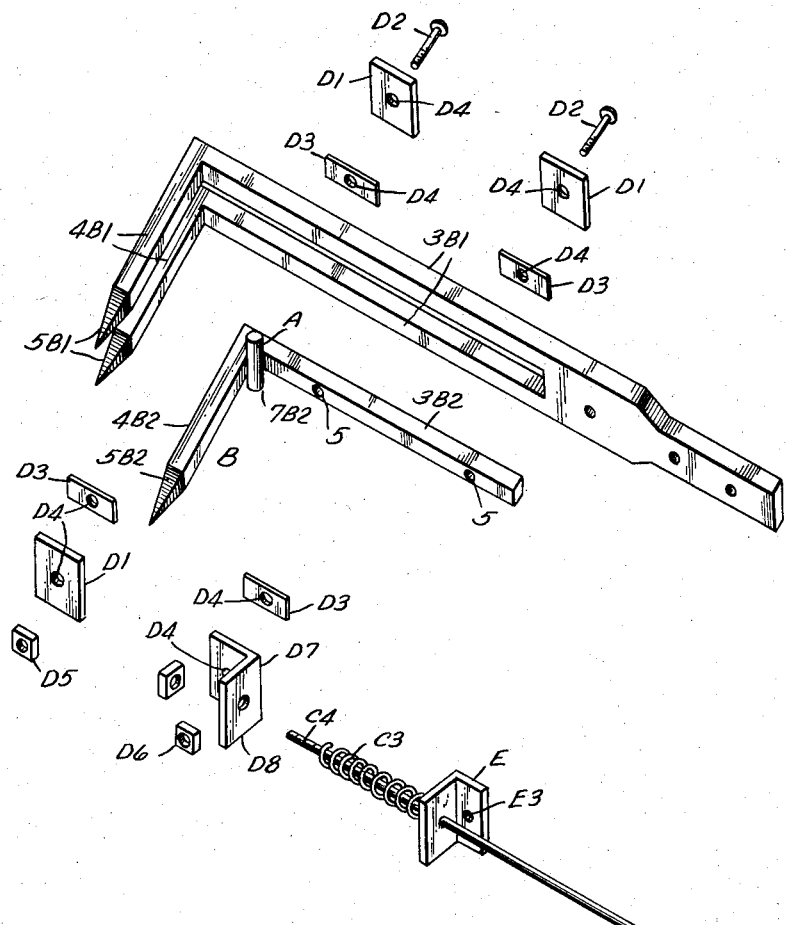

April 14, 1959  C. E. ABBOTT  2,882,085
HAND WEEDER
Filed Jan. 23, 1957  2 Sheets-Sheet 1
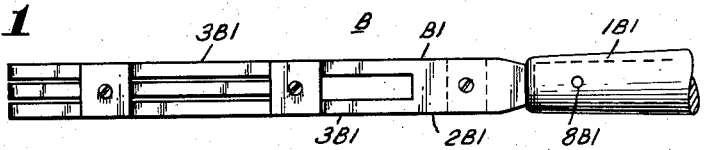
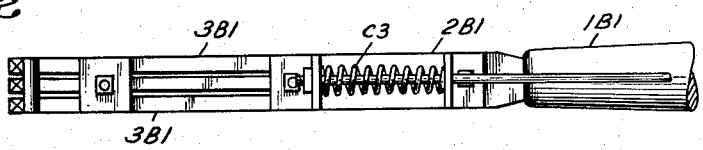
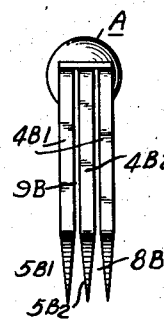
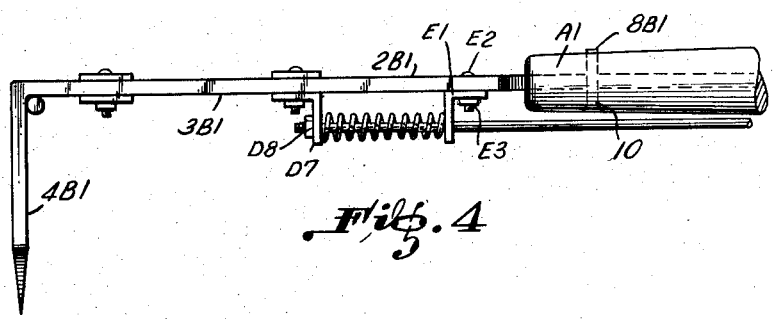
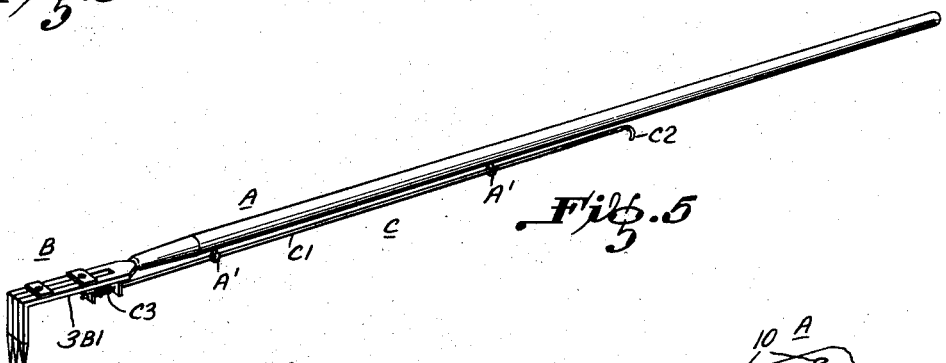
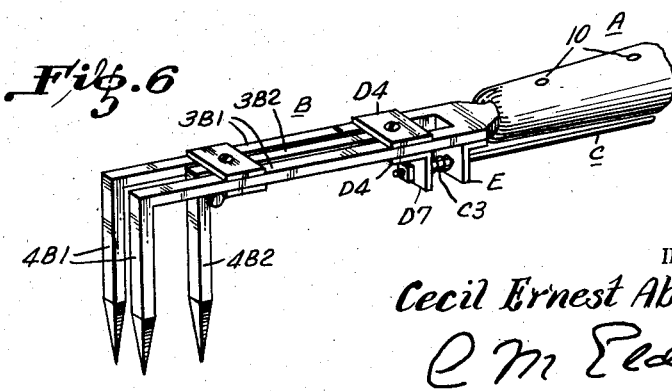
INVENTOR
Cecil Ernest Abbott
BY
Attorney April 14, 1959   C. E. ABBOTT   2,882,085
HAND WEEDER Filed Jan. 23, 1957   2 Sheets-Sheet 2

INVENTOR
Cecil Ernest Abbott

BY
Attorney

United States Patent Office 2,882,085
Patented Apr. 14, 1959

2,882,085

HAND WEEDER

Cecil Ernest Abbott, Staunton, Va.

Application January 23, 1957, Serial No. 635,748

3 Claims. (Cl. 294—50.9)

My invention relates generally to the field of horticulture, of which gardening is typical. More particularly it concerns provision of a new cultivator, particularly a new weeder, possessing weed-ejection facility.

An object of my invention is to provide a new type of hand cultivator which, light in weight, easy to handle and simple in use, can be readily employed by the user in rapid and direct manner without necessity of particular skill or need to bend or stoop to segregate, pick up, remove and eject weeds and generally similar plant life, from the lawn, garden, or the like. The ready ejection from the instrument of the plucked weed or the like rapidly conditions the instrument for further use. The tool is employed in a raking or back hoe motion, as contrasted with the usual frontal or shoveling motion; and it quickly and almost automatically assumes the best working angle with respect to the ground while in use.

Another object is to produce a cultivator generally of the type described which, certain and direct in its operation, is of low first cost, employing only readily available, inexpensive and non-strategic materials, is sturdy in construction and of long useful life, involving only a minimum number of moving parts, which in themselves are sturdy in construction and substantially immune to failure; which instrument displays long useful life with but little necessity for repair and in which all parts are kept readily aligned for proper operation with but minimum adjustment at infrequent intervals.

Other objects and advantages will in part be obvious and in part more fully pointed out hereinafter during the course of the following description, particularly when the same is considered with reference to the attached drawings, forming part of this specification.

Accordingly, my invention may be properly considered to reside in the several component parts, elements, materials and features of constructure, in the several mechanisms, and as well, in the relation of each of the same to one or more of the others, the scope of the application of all of which is more fully set forth in the claims at the end of this disclosure.

Figure 8:

In the several views of the drawings, wherein I disclose that embodiment of my invention which I prefer at the present time, Figures 1, 2, 3 and 4 respectively constitute, in fragmentary disclosure, top and bottom plan views and end and side elevations of the tine portions of my new cultivator, the tines being illustrated in closed position;

Figure 5 discloses, on reduced scale, the complete cultivator, again with tines closed and in position for cultivation;

Figure 6 discloses, on enlarged scale with respect to the disclosure of Figure 5 and in perspective view, the assembly details of the working head of my new cultivator, with the tines opened, in weed-ejection position;

Figure 7 is an exploded view, showing the component elements of the working head of my new cultivator; while Figure 8 discloses the complete cultivator in side elevation and approximately in preferred dimensional ratio.

Throughout the several views of the drawings like reference characters denote like structural parts.

To permit more ready and thorough understanding of my invention it may be noted at this point in the disclosure that in the realm of horticulture, hand cultivation of plants, gardens, and lawns and the like has constantly and enduringly posed a challenging problem. And while much attention has been directed to this general field, and this over a long period of years, substantial room for improvement remains in this general domain. For experience has demonstrated that for any one or combination of a number of reasons, known and available cultivators have proved not to be entirely satisfactory, and have fallen short of optimum results.

While the well-known short-handled cultivator, having a total length of approximately 10 to 18 inches or thereabouts, will satisfactorily engage the ground at a proper work angle and thereafter can be manipulated successfully by the user to remove any small number of weeds, plants or the like or to cultivate an extremely limited area, they can be used only from a kneeling, stooping or squatting position. The user quickly tires. A short instrument of this general type has proved to be entirely unsuited for prolonged use.

On the other hand, known long-handled tools of this general type, designed for use without appreciable stooping or bending in use, have proved not to be entirely satisfactory. This is largely because it is difficult to position the working face or edge of such elongated tool on the ground at such proper angle to the plant or weed that upon subsequent application of force by the user to the tool the latter can be so inserted into the ground that the plant can be surely and positively severed therefrom at proper subsurface level and thereafter removed. Usually, the plant is cut off at too shallow a point, and will grow anew from the root which has been left in the ground. To ensure proper root removal requires bending while applying the tool. And this requirement defeats the purpose of the elongated handle.

Moreover, in most of these known handle cultivators, whether the handle portion thereof be long or short, the mode of use involves a generally shoveling action, with the work stroke of the tool being directed outwardly and away from the user; i.e. the tool is positioned between the user and the plant undergoing cultivation. Further, with both short and long handle cultivators of known types, a problem is interposed of quickly ejecting the plant from the working head of the tool after the plant has been severed from the ground.

Other known cultivators have proved uncertain, unpredictable and generally unsatisfactory in use, and either of too high a first cost or too fragile in use.

An important object of my invention, therefore, is to effectively minimize and in large measures eliminate the several defects and disadvantages heretofore confronting the art, and at the same time to provide a simple and effective hand cultivator, used much in the manner of a rake or back hoe, with a drawing motion towards the user and with the tool initially interposed on the far side of the plant undergoing treatment from the user, which instrument the user can effectively operate from an upright position without stooping while applying the working head of the tool in natural manner, at the most effective angle of the instrument to the ground, and thereby effectively severing the plant near the bottom of its root structure from the ground, with subsequent simple and ready ejection of the severed plant from the working head of the tool, and this by remote control from the upper part of the handle portion of the cultivator.

And now having reference to that embodiment of my invention disclosed in the several views of the drawings, the cultivator may be seen generally to comprise a handle A, a working head B and a weed ejector C. The handle A is of such length and cross-sectional dimensions as most effectively to accommodate to comfortable and ready use thereof by the user. Similarly, I prefer to form this handle of such materials, which comparatively cheap and readily available, will effectively prove comfortable in use to the used. Typically, I find a handle length of approximately 4 feet 4 inches to be satisfactory. While diameter may be uniform throughout the length of the handle A, I prefer to impart a degree of taper thereto, with enlarged shank portion A' in the region of the working head and with a diameter of approximately 1 inch in the head-remote region where the user grasps the handle A with his hands. Plastic may be satisfactorily employed as a handle material, perhaps with a centrally disposed metal reinforcement. Typically and preferably, however, I form the handle A of wood, hard wood having proved to be preferable for this purpose. I find that a diameter of approximately one inch in the head-remote region of the handle A will readily accommodate to the hands of the typical user, and at the same time will impart requisite strength to the handle.

The working head B is best illustrated in Figures 1 through 4. This working head comprises a generally fork-like element B1. At its handle-adjacent end this fork-like element B1 terminates in a shank end 1B1. This end 1B1, flattened and of reduced section is nicely received in a corresponding slot or recess A1 provided in the head-adjacent end of the handle A (Figure 4). One or more set screws or the like 10 (Figures 4 and 5) pass through the handle 10 and the tool shank 1B1, firmly securing them together. Rivets or other securing means may be substituted where desired. The shank portion 1B1 is provided, as is evident from Figures 1, 4 and 7, with drilled bores 8B1 of small dimensions for the reception of these set screws 10, the use of two or more set screws in spaced relation effectively locking the working head B to the handle A.

The fork-like element B1 (Figure 1) is of generally bifurcated construction, with a yoke-like head 2B1. On this head 2B1 I provide two or more fixed tines 3B1. At the present I find two such tines to be sufficient for my purpose.

My research discloses that a length of tine from yoke to outer, ground-adjacent end of the tool of approximately 6 inches is entirely satisfactory for my purpose. While such spacing is not necessarily critical, a lateral spacing between tines of about ⅓ inch has proved effective, the tines themselves being formed of rod material of approximately ¼ inch square section.

At the handle-remote end of the working head B, I bend the tine elements 3B1 at right angles, thereby providing ground-penetrating working ends 4B1 thereon. These working ends 4B1, having total length of approximately 3½ inches (this length is not critical), terminate in tapered and sharpened teeth 5B1 having total length of say, ½ inch. Thus, the taper is preferably elongated, to provide moderately sharp spikes. It will be seen that the spaced tines 3B1, 3B1 and the yoke-like head 2B1 provide between them an elongated slot 6B1 which extends generally in the prolongation of a longitudinal plane extending through the handle A.

Within the slot 6B1 thus provided I mount for longitudinal reciprocation a removable tine B2. The reciprocal movement of this tine B2 in the slot 6B1 relative to the fixed tines 3B1, 3B1 is for a purpose which will be developed. The movable tine B2 has a length of approximately five inches, so that in a typical embodiment it will have a play within the slot 6B1 of approximately one inch. Again, however, this dimension is not highly critical. The controlling criterion is that the length of movement of the tine B2 is sufficient to provide satisfactory ejection of the plucked weed.

In manner generally similar to the working end 4B1 of the fork-like elements B1 I provide the movable tine B2 with a working end 4B2 which is inturned at right angles to the shank portion 3B2 of this movable tine B2. The length of this working end 4B2 is the same as that of the working ends 4B1. And in manner generally similar to the working ends of the fixed tines this working end 4B2 terminates in tapered tooth 5B2. This tooth 5B2 has the same length and cross-sectional configuration of the previously-described teeth 5B1.

I provide a stop 7B2 transversely across the junction of the inner faces of the portions 3B2 and 4B2 of the movable tine B2, i.e. on the inner face of the apex angle formed by such junction. This stop, which may be formed of any suitable material, such as steel rod, and of any desired section, is welded or otherwise secured to the tine B2. The ends A and B of this stop 7B2 project outwardly beyond the lateral surfaces of the movable tine B2 to an extent sufficient, as shown in Figures 4, 5, 6 and 7, to abut against the fixed tines 3B1, 3B1 at the inner faces of their junction with their respective working heads 4B1. Relative play of the movable tine B2 with respect to the fixed tines 3B1, 3B1 is limited, at the handle end by shank 3B2 striking against the yoke-like head 2B1 at the handle end of the working head B, and at the handle-remote end by the stop 7B2 striking against the working ends 4B1 at the ground-adjacent end of the working head B.

It may be noted, having reference to the disclosure Figure 3, that the lateral spacing between working ends 4B1 and 4B2 is just sufficient to permit the stem of the average plant, guided by the greater spacing existing between teeth 5B1 and 5B2 (as shown at 8B in Figure 3), to jam in these slots 9B.

From the foregoing it will be seen that the tool, once assembled, can be effectively employed by applying it with the working head adjacent the ground, with teeth applied to the surface of the ground in the region of the plant or weed to be removed. Thus applied in rake-like manner, somewhat akin to what is known as a back hoe, the length of the handle A is such that with the user standing upright, the tool assumes such proper angle with respect to the ground that when the user exerts force on the tool the teeth 5B1 and 5B2, arranged side by side, penetrate to the proper depth beneath the surface. With these teeth pulled or scraped against the roots of the plants, these latter will be contacted near the bottoms of their roots. With further pull of the tool towards the user, with follow through on an up sweep, the weed is bodily separated from the ground so that further pull of the tool through an upward swing brings the weed out of the soil. It is nearly as satisfactory if the weed is severed near the bottom of its roots. A projection of the angle of contact of the tool with the ground through the full pull of the tool discloses such angle to be compound.

From this description of the general mode of using my new tool, it will be seen that it is essential that the fixed and movable teeth of the tines normally be maintained in registry and alignment, conditioned for raking action. It will also be apparent at this stage of the disclosure that after the weed has been severed and the working head B removed from the ground, it is essential promptly and readily to eject the plucked weed from the working head B, thereby conditioning the latter for further use. To achieve these results I provide on the cultivator means which, while normally retaining the movable tine B2 in its slot 6B1 with its working end 4B2 aligned in the same plane as that of the working ends 4B1 of the fixed tines 3B1, at the same time and when desired, will move tine B2 in its slot and relative to the fixed tines from its position shown in Figure 5 into its position shown in Figure 6, where the weed is ejected.

To achieve the foregoing reciprocating action I provide the ejector assembly which I disclose generally in Figures 2, 4, 5 and 7, and which I will now describe.

This ejector C comprises an elongated shaft C1, preferably having a total length of something more than 2½ feet. This shaft lies closely adjacent to and along the handle A, extending along the handle A, away from the working end of the related movable tine structure B2, and being connected, in manner to be described, to the free end of the shank portion of this movable tine structure. Guides A1, A1 are made fast to the handle A adjacent the lower end thereof, and engage about and retain and guide the shaft C1. Typically, the lower of the two guides A1 is disposed approximately 6 inches from the bottom end of handle A, while the upper guide A1 is disposed about 18 inches from the lower guide. The shaft C1 is adapted for longitudinal movement through the guides A1, A1, along the length of the handle A. At the upper end of the shaft C1, I provide a suitable looped or hooked finger grip C2.

I employ this shaft C1 to reciprocate the movable tine structure B2 in the slot 6B1 in which it travels. Normally, the movable tine structure B2 remains in its rest position, best illustrated in Figures 2, 3 and 5, and I employ the finger actuation of the shaft C1 to pull the movable tine out of its rest position, in alignment with the fixed tines, 4B1, 4B1 (as disclosed in Figure 3) into the weed-ejector position, best disclosed in Figure 6.

I rely on suitable kinetic energy means, shortly to be disclosed and acting upon release of the finger grip C2, positively to restore the movable tine 4B2 from its weed-ejector position of Figure 6 into its rest position of Figure 5 with tines transversely aligned and the tool conditioned for further use in cultivation. Preferably I form the elongated shaft C1 of steel rod, rodding of $5/32$ inch diameter having proved suitable. But since this shaft is employed only in tension, it is entirely possible to use flexible and braided cable or the like, of metal or other materials, for this purpose. When flexible cable is resorted to, the upper guide A1 is moved upwardly into contact with the finger grip C2.

As disclosed in Figures 1, 2 and 4, as well as in Figures 5 and 7, I provide suitable guide and retainer means for keeping the movable tine structure B2 in alignment with the fixed tine 3B1, 3B1 free for ready reciprocation in the elongated slot 6B1 provided between these fixed tines. And as is clearly evident from the disclosure of Figure 1, these retainers extend transversely across the tines and are spaced along the length thereof.

As is evident from the exploded view of Figure 7, each such guide and retainer assembly comprises a retainer plate D1 disposed one on each side of the tine assembly and along the longitudinal extent thereof. Typically, these retainer plates D1 are ¾ inch square, formed of $3/32$ inch steel plate and centrally bored for the passage of bolt D2. Where desired, metal shims D3 may be interposed between the retainer plates D1 and the movable tine 3B2. Where these shims B3 are employed I typically form them of $3/32$ inch plate, imparting thereto surface dimensions of say ¾ inch by ¼ inches. The plates D1 and the shims are each centrally drilled, as at D4, for the reception of bolt D2. Similarly, the movable tine 3B2 of tine structure B2 is drilled as at 5 for the passage freely therethrough of the aforesaid threaded bolt D2. Finally, I provide nuts or the like D6 for locking down the retainer plates in assembly. Such assembly is disclosed in Figures 2, 4, 5 and 6.

It will be seen that these keeper assemblies are fast to, and work with, the movable tine 3B2 of tine structure B2, effectively retaining the same in the slot 6B1 in which it travels. The shims D3 effectively ensure that the keeper assemblies move freely with respect to the fixed tine 3B1 and do not bind thereagainst.

From the foregoing disclosure it is apparent that reliance is placed on positive means to restore the movable tine 3B2 to its rest position as shown in Figure 5, once it has been brought, under finger control, to its weed-ejector position shown in Figure 6. Although many expedients will readily suggest themselves to those skilled in the art for this purpose, preferably I rely on suitable energy-storage means such as a retractile coiled spring C3, wound about the lower end of the shaft C1. Energized as an incident to finger-controlled movement in tension of rod C1 the spring C3, through its kinetic energy thus stored, serves to restore the tine 3B2 upon release of the finger grip C2. To bring about this action I find it sufficient to form the retainer plate D1 (Figure 3) shown most closely adjacent the shaft C1 at the lower right of the exploded view, Figure 7, with a laterally outwardly projecting ear D7, which serves as a bearing plate for the spring C3. I provide a central and threaded opening D8 in the plate D7 in which the threaded end C4 of the shaft C1 may be engaged. Finally, I mount an L-section stop E on the yoke-head 2B1 of the working head B in any suitable manner, as by threaded bolt E2 passing freely through an opening E3 in the stop E and engaging in a threaded bore 7B1 in the yoke 2B1.

With the complementary stops D7 and E provided as shown in Figures 6 and 7 the spring is limited as to its play. As the rod C1 is drawn upwardly along the handle A by finger grip C2, the spring C3 is compressed between plates D7 and E, fast to the movable tine structure B2 and the fixed yoke head 2B1, respectively. As soon as the finger grip C2 is released spring C3, reacting against the fixed stop E, moves the stop D7 bodily downward towards the fixed working ends 4B1 of the fixed tine 3B1. The stop D7, thus moved, carries with it the movable tine and the elongated shaft C1. The working end 4B2 of the movable tine structure B2 is thus spring-restored into alignment with the working ends 4B1 of fixed tines 3B1.

It is apparent from the foregoing that the constructure is simple and sturdy. Only a minimum number of movable parts are involved. All elements are formed of requisite size and from sturdy materials. Breakage is kept at extremely low level. Necessity for repairs or replacement is materially reduced. The action of such movable parts which are present is positive, certain and free. All tendency of these movable parts to bind against each other is effectively suppressed.

Without appreciable fatigue, the user can effectively employ the new tool from an upstanding position, and this over long work periods. The tool, in use and with something akin to a hoeing action, almost automatically assumes a position relative to the ground which will give rise to most effective action on the lower roots of the plants to be removed. The sharp points of the tool are effectively positioned in the ground relative to the root of the plant. And since the plant desired to be contacted by the instrument, such as a weed, is to be removed any damage thereto caused by the sharp points of the tines is of no consequence.

All the foregoing, as well as many other highly practical advantages attend the practice of my invention. I intend the foregoing disclosure as simply illustrative of the wide scope of the application of my new invention, a scope which should be limited only by the compass of the appended claims.

I claim:

1. A weed puller comprising, in combination, an elongated handle of length sufficient to permit the user to manipulate the same by hand while standing erect or nearly so; a working head terminating at one end in a shank which latter is in alignment with and engages with and is made removably fast to one end of said elongated handle, said working head being bifurcated to provide a yoke-like head portion which merges into said shank and, extending from said yoke-like head portion in a direction opposite to said shank, like stationary tines of like orientation, which said tines extend in parallel direction and closely adjacent each other, the inner or shank-adjacent ends of said tines extending in substantial alignment with said handle and providing a slot between adjacent tines, which said slot is closed by said yoke-like head portion, the said tines at their extremities opposite said yoke-like head portion terminating in outer and sharpened ends which are disposed side by side in alignment with each other, and with like orientation relative to said handle, these sharpened outer ends of the stationary tines being in-turned, all in the same direction, in generally L-shape, at approximately right angles to the handle, in manner generally similar to a hoe; a movable and generally L-shaped tine of approximately the same configuration as said first-mentioned and stationary tines, said movable tine being mounted with like orientation within the slot between adjacent fixed tines, for limited longitudinal movement within said slot and relative to said fixed tines, the sharpened outer end of said movable tine being reciprocable towards and away from, and with the sharpened outer end thereof moving into and out of transverse alignment with, the sharpened and in-turned outer ends of said fixed tines; means mounted on and cooperating with said fixed tines for restraining and maintaining said movable tine for limited reciprocation in said slot relative to said fixed tines; spring-like and retractile means for normally and positively urging and maintaining said movable tine towards the handle-remote end of the slot in which it slides, and into position such that the sharpened outer end of the movable tine is normally maintained in alignment with the like ends of said fixed tines; and means fast to said movable tine and acting against said fixed tines for sliding said movable tine in said slot, at the will of the operator, towards the handle, to bring the sharpened and in-turned end of the movable tine out of alignment with the like ends of the fixed tines.

2. A weed puller as in claim 1 and including a lateral stop provided on the inside of the generally L-shaped movable tine, at the bend where the sharpened outer end of the tine is in-turned, at generally right angles to the shank of said working head, the said stop extending laterally and transversely of said movable tine at each side thereof, beyond the confines of the movable tines and into the projection of the in-turned portions of said fixed tines; said stop being engageable with and capable of abutting against the corresponding inside of the bend of the generally L-shaped fixed tines, thereby to limit the movement of the movable tine in its slot in direction away from the handle, and thereby normally assuring alignment of both fixed and movable tines in a transverse row as viewed with respect to the handle; and the closed or yoke end serving as a stop for said movable tine at the outer end of the slot provided between the fixed tines.

3. As part of a hand weeder and in combination, a working head for said weeder, including elongated and generally L-shaped tine portions made fast at their inner ends to a transverse and yoke-like head common to all such tine portions; the outer ends of said tine portions being in-turned, all with the same orientation with respect to said yoke-like head, and comprising the short legs of said L-shaped tine portions and terminating in outer and pointed working ends, the intermediate or longer leg portions of the tines defining between them an elongated slot in said working head along the longitudinal extent of this latter, which said slot is closed at one end by said yoke-like head; an additional tine portion, also of generally L-shape, with orientation relative to said yoke-like head the same as said first-mentioned tine portions, received and bodily movable within said slot; spring-like and retractile means normally retaining the pointed ends of said movable tine portion in transverse alignment with the pointed ends of said fixed tine portions; means operable at the will of the user for bodily moving said movable tine in said slot towards said yoke-like head and with the pointed end of the movable tine out of transverse alignment with the pointed ends of the fixed tine portions; the said elongated slot being of width throughout its length sufficient to receive the longer leg portion of the movable tine portion for free movement therein with sufficient spacing between the pointed, outer ends of the short and in-turned leg portions of said fixed and movable tine portions to receive in jam-free manner the stems of plants undergoing treatment by the weeder; guides, comprising stop elements, extending between the movable tine portion and the fixed tine portions and confining the movable tine to free sliding movement in the elongated slot; and means, removably fast to said fixed tine portions, for restraining and maintaining said movable tines within said slot but permitting sliding and longitudinal movement therein.

References Cited in the file of this patent

UNITED STATES PATENTS

| | | |
|---|---|---|
| 51,893 | Eaton | Jan. 2, 1866 |
| 195,186 | Tyner | Sept. 11, 1877 |
| 824,642 | Gibbs | June 26, 1906 |
| 1,158,637 | Chorvath | Nov. 2, 1915 |